United States Patent Office 3,567,618
Patented Mar. 2, 1971

3,567,618
FLUORIDIZED GRAPHITE AND METHOD OF MANUFACTURE THEREOF
Louis Foulletier and Roland Bachelard, Lyon, France, assignors to Ugine Kuhlmann, Paris, France
No Drawing. Filed Oct. 23, 1967, Ser. No. 677,071
Claims priority, application France, Oct. 24, 1966, 81,279
Int. Cl. B01k 3/08
U.S. Cl. 204—294                                                  10 Claims

ABSTRACT OF THE DISCLOSURE

Graphite and articles manufactured therefrom may be fluoridized to an extent hitherto unattainable by subjecting the graphite to repeated fluoridation cycles until the desired degree of fluoride penetration is achieved. Each fluoridation cycle comprises the steps of (a) degasing the graphite under vacuum, (b) contacting the graphite with fluorine gas under reduced pressure and at an elevated temperature, and (c) removing the fluorine gas from contact with the graphite.

BACKGROUND OF THE INVENTION

(I) Field of the invention

This invention relates to fluoridized graphite and a method whereby fluoridation is achieved. In particular it relates to a method of fluoridizing graphite by subjecting it to a process of fluoridation under reduced pressure and at elevated temperatures, which process is repeated until the desired fluorine penetration has been achieved. The fluoridized graphite is resistant to wear and crumbling, especially when subjected to electrolytic corrosion.

(II) Description of the prior art

It is known that the action of fluorine on graphite leads to the formation of such fluor carbon compositions as $C_4F$, $CF$, and $(CF)_n$; the particular compound that is formed depends upon the temperature at which fluoridation is carried out. At temperatures on the order of from 500°–550° C. the reaction becomes explosive.

The presence of fluorine even in a fluorine to carbon ratio of one or less confers on the graphite the properties of water and oil repellance together with a high chemical inertia. French Pat. No. 1,386,000 describes a process for the fluoridation of graphite which exploits these properties. According to the French process the graphite is placed in a reaction vessel of nickel which is heated to 350° C. and through which is passed a flow of fluorine gas. The fluorine gas may be in the form of a halogen fluoride or a mixture of such fluorides or, preferably, a mixture of fluorine gas and an inert gas such as nitrogen, argon, helium or carbonic anhydride gas. For example, a gas mixture of 3 percent fluorine and 97 percent nitrogen where the flow of gas is continued for a sufficient period of time is representative of the method of the French patent.

Previous methods, however, have not been entirely successful because of the superficial nature of the fluoridation that is accomplished thereby; almost the entire quantity of fluorine which penetrates the graphite is concentrated in a thin surface layer. These methods, therefore, are of little value when it is desired to fluoridate thick pieces of graphite such as graphite electrodes which are subject to severe operating conditions in electrolytic cells employing sodium chloride. It is necessary, therefore, that a process be obtained whereby graphite of large thicknesses may be fluoridized to any desired extent and, if necessary, to the core thereof.

SUMMARY OF THE INVENTION

The present invention is based on the discovery that graphite or articles made thereof may be fluoridized to an extent hitherto unattainable by subjecting it to repeated fluoridation cycles until the desired degree of fluoride penetration has been achieved. Each fluoridation cycle comprises the steps of (a) degasing the graphite under vacuum, (b) contacting the graphite with fluorine gas under a pressure less than 1 atmosphere and at an elevated temperature, and (c) removing the fluorine gas from contact with the graphite. The degasing of the graphite is advantageously carried out at an elevated temperature which materially aids in the degasifying process. The removal of the fluorine gas at the end of the fluoridation process may be accomplished by means of a vacuum or by flushing the reaction vessel in which the graphite is treated with an inert gas or by a combination of both.

We have found that, for reasons which are not clearly understood but which appear to pertain to diffusion effects, during fluoridation of graphite by previously known methods the absorption of fluorine by the graphite gradually declines and finally stops. This same phenomenon occurs in the fluoridation cycle of this invention. In order that the fluoridation may continue until the desired fluorine penetration has been accomplished, the graphite is subjected to repeated fluoridation cycles with a degasing operation under vacuum between each cycle.

During the second fluoridation cycle, the speed of fluorine adsorption by the graphite is greater than during the first cycle. The second cycle, however, is also characterized by a decline in the speed of fluoridation. But with successive fluoridation cycles the speed of fluoridation increases substantially until there have been employed a number of cycles sufficient to attain the desired degree of fluorine penetration. In this manner the fluorine penetration may be regulated, by the number of cycles employed, to permit only slight penetration or, if desired, penetration to the core of the graphite.

DESCRIPTION OF THE PREFERRED PRACTICE OF THE INVENTION

Degasing of the graphite in a reaction vessel is preferably carried out under vacuum at a temperature in the range from about 200°–1,000° C. A degasing temperature of about 400° C. has been found to be particularly advantageous especially between fluoridation cycles as it tends to promote the penetration of fluorine into the pores of the graphite and throughout the mass thereof. The degasing process lasts from about 2 to 18 hours depending upon the size of the graphite workpiece undergoing treatment. For example, a degasing of 2 or 3 hours at 400° C. is considered sufficient for a graphite test piece of 30 millimeters thickness.

The fluoridation proper of the graphite is carried out at a temperature in the range from about 250–500° C. and, preferably, at a temperature in the range from about 300°–400° C. The time of contact of graphite and fluorine gas will vary with the porosity of the graphite workpiece and may vary, for example, from 15 to 120 minutes. The fluorine is introduced into the reactor vessel while the latter is under vacuum so as to obtain a pressure of fluorine within the reactor of less than 1 atmosphere and, preferably, a fluorine pressure between 20 and 500 millimeters of mercury.

Between successive fluoridation cycles, the reaction vessel is preferably purged with an inert gas such as nitrogen, helium, argon and carbonic anhydride gas to remove the fluorine gas from contact with the graphite. Vacuum may be used for this purpose also but a combination of both purging with an inert gas and vacuum is most advantageous.

The process of this invention makes possible the achievement of complete penetration of fluorine to the core of the graphite workpieces treated with the resultant advantage, among others, that it is possible to treat industrial electrodes of large thicknesses not merely at their surface but throughout so as to impart to them a uniform corrosion resistance throughout their life in electrolytic cells.

The following examples show the efficacy of the present invention by means of a comparison between the present invention and the method of fluoridation which has heretofore been used.

Example 1

This example describes the fluoridation of a graphite test piece having dimensions of 90 x 30 x 30 mm., by previously known methods.

The test piece was placed inside an iron reactor vessel 620 mm. in height and 120 mm. in diameter through which there was passed at a rate of 4.3 mols per hour a mixture of fluorine and nitrogen comprising 5 volumes of fluorine for each 95 volumes of nitrogen. The treatment was continued for 2½ hours at a mean temperature of 350° C. inside the reactor vessel.

Upon removal from the reactor, the test piece had a flat gray surface color; the surface had a tendency to disintegrate into powder. The weight of the sample had increased from 160 to 161.65 grams.

Samples taken at various depths showed that in a layer 2 millimeters thick at the surface, the percentage of fluorine had risen to 3.48%. At greater depths the fluorine percentage decreased below the minimum determinable limit by the method of analysis employed, i.e. below 0.04%.

Example 2

This example illustrates the process of the invention and is to be contrasted with Example 1 which illustrates the prior art. In this example a graphite test piece of the identical dimensions and from the same piece of graphite as in Example 1 was fluoridized according to the method of the present invention.

The test piece was placed in the same reactor as in Example 1 and the reactor heated to a temperature of 362° C. ±6° C. The reactor was evacuated and commercial grade fluorine of 99% purity was introduced therein up to a pressure of 52 millimeters of mercury. After contacting the graphite with fluorine for 30 minutes the fluorine was swept from the reactor by flushing it with a stream of nitrogen.

A second fluoridation cycle was then begun by restoring the vacuum in the reactor and subsequently introducing fluorine under the conditions previously indicated.

After five cycles of such a treatment extending over a total of 4 hours there was observed an increase in the weight of the test piece of 0.75 gram. The surface of the test piece had kept its initial brilliance. Analysis showed that in a surface layer 2 millimeters thick the percentage of fluorine amounted to 0.674% and at the core of the piece it amounted to 0.23%.

Thus it will be seen that by the process of the invention as shown in Example 2 the test piece was caused to absorb fluorine all the way to the core or center thereof, the percentage of fluorine at the core being no less than one-third that at the surface. In contrast, in Example 1 carried out according to the methods of the prior art, the ratio of fluorine at the core to fluorine at the surface of the test piece was about 1 to 83. In addition, the test piece of Example 2 processed in accordance with the invention retained its initial surface brilliance whereas the test piece of Example 1 tended to disintegrate into powder.

While the invention has been described hereinabove in terms of a representative example of the process thereof, the invention itself is not limited thereto, but rather comprehends all modifications of and departures therefrom properly falling within the spirit and scope of the appended claims.

We claim:
1. A method for treating thick articles made of graphite which comprises subjecting the graphite article to repeated fluoridation cycles, wherein each cycle comprises the steps of:
   (a) degasing the graphite article under vacuum at a temperature of from about 200° C. to about 1000° C.,
   (b) contacting the graphite article with fluorine gas under a pressure less than 1 atmosphere and at a temperature of from about 250° C. to about 500° C., and
   (c) removing the fluorine gas from contact with the graphite article.

2. A method according to claim 1 wherein the graphite is contacted with fluorine gas at a pressure in the range from about 20 to 500 millimeters of mercury.

3. A method according to claim 2 in which the graphite is first degased at a temperature of about 400° C. and is subsequently contacted with fluorine gas at a temperature in the range from about 300°–400° C.

4. A method according to claim 3 wherein the fluorine gas is removed from contact with the graphite by flushing the graphite with an inert gas.

5. An article of manufacture comprising a unitary mass of graphite subjected to repeated fluoridation cycles, wherein each cycle comprises the following steps:
   (a) degasing the graphite under vacuum,
   (b) contacting the graphite with fluorine gas under a pressure less than 1 atmosphere and at an elevated temperature, and
   (c) removing the fluorine gas from contact with the graphite.

6. An article of manufacture in accordance with claim 5 wherein the graphite is contacted with fluorine gas at a pressure in the range from about 20 to 500 millimeters of mercury.

7. An article of manufacture in accordance with claim 6 wherein the graphite is first degased at a temperature of about 400° C. and is subsequently contacted with fluorine gas at a temperature in the range from about 300°–400° C.

8. An article of manufacture in accordance with claim 7 wherein the fluorine gas is removed from contact with the graphite by flushing the graphite with an inert gas.

9. A method according to claim 1 wherein the fluorine gas is in the form of a halogen fluoride or a mixture of halogen fluorides.

10. A method according to claim 1 in which the fluorine gas is in the form of a mixture of fluorine gas and an inert gas.

References Cited

UNITED STATES PATENTS 935,180  9/1909  Williamson _____ 117—228

FOREIGN PATENTS 1,386,000  12/1964  France _____ 117—228

OTHER REFERENCES

De Torre et al., Anales Real Soc. Espan. De Fisica Y Quimica (Madrid) Ser. B, 61(12) 1197–1204.

PATRICK P. GARVIN, Primary Examiner

U.S. Cl. X.R.

117—228; 136—121; 252—502